United States Patent [19]
Kano et al.

[11] 3,941,974
[45] Mar. 2, 1976

[54] ARC WELDING PROCESS

[75] Inventors: Motomi Kano, Fujisawa; Hitoshi Shioyama, Kamakura; Yasuhito Takeuti, Fujisawa; Masahiro Niikawa, Kamakura, all of Japan

[73] Assignee: Kobe Steel Ltd., Kobe, Japan

[22] Filed: May 18, 1973

[21] Appl. No.: 361,585

[30] Foreign Application Priority Data

May 20, 1972 Japan............................ 47-50013

[52] U.S. Cl............................ 219/137 R; 219/123
[51] Int. Cl.²........................................ B23K 9/08
[58] Field of Search............. 219/123, 73, 126, 137

[56] References Cited
UNITED STATES PATENTS

| | | | |
|---|---|---|---|
| 1,740,381 | 12/1929 | Weed | 219/123 |
| 1,827,657 | 11/1931 | Ipsen | 219/123 |
| 1,886,524 | 11/1932 | Chapman | 219/123 |
| 2,152,194 | 3/1939 | Jones | 219/123 X |
| 2,220,576 | 11/1940 | MacKusick | 219/73 |
| 2,773,969 | 12/1956 | Günther | 219/123 X |
| 2,809,278 | 11/1957 | Persson | 219/123 |
| 2,882,384 | 4/1959 | Foster | 219/123 X |
| 2,920,183 | 1/1960 | Greene | 219/123 |
| 2,994,763 | 8/1961 | Schultz | 219/123 |
| 3,296,412 | 1/1967 | Waite et al. | 219/126 |
| 3,515,846 | 6/1970 | Nakamura | 219/137 |

FOREIGN PATENTS OR APPLICATIONS

| | | | |
|---|---|---|---|
| 4,642,962 | 12/1971 | Japan | 219/123 |

Primary Examiner—J. V. Truhe
Assistant Examiner—Clifford C. Shaw
Attorney, Agent, or Firm—Oblon, Fisher, Spivak, McClelland & Maier

[57] ABSTRACT

There is disclosed a novel arc welding process of the type in which an electrode is placed in a weld groove with an insulating material interposed between the electrode and the inner surfaces of said groove. The process utilizes the principle by which an arc produced tends to be directed toward a region having the least or thinnest density of magnetic flux. Accordingly, this permits the welding arc produced to be directed toward the desired portion in the weld groove, thereby giving greater penetration thereat. For such purposes, various embodiments are presented, such as placing a subsidiary backing member of a ferromagnetic substance above or beneath the weld groove, causing electric current to flow through the backing member independently of the welding current, or providing two backing members in the same manner described through which, for instance, alternating currents having a phase difference of 180° are caused to flow with a direct current used as a welding current to thereby alternately direct the welding arc between said inner surfaces of the weld groove, with a resultant uniform but deep penetration therein. This principle further permits the adjustment of the depth of penetration by controlling the amount of the electric current flowing through the backing member.

2 Claims, 36 Drawing Figures

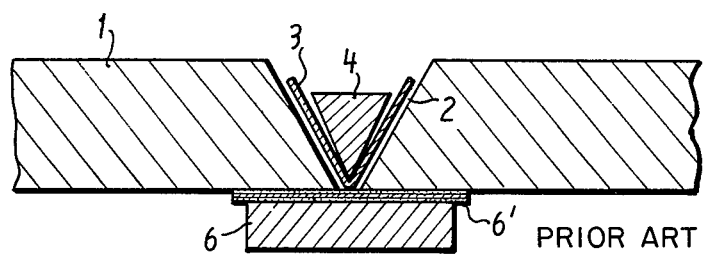
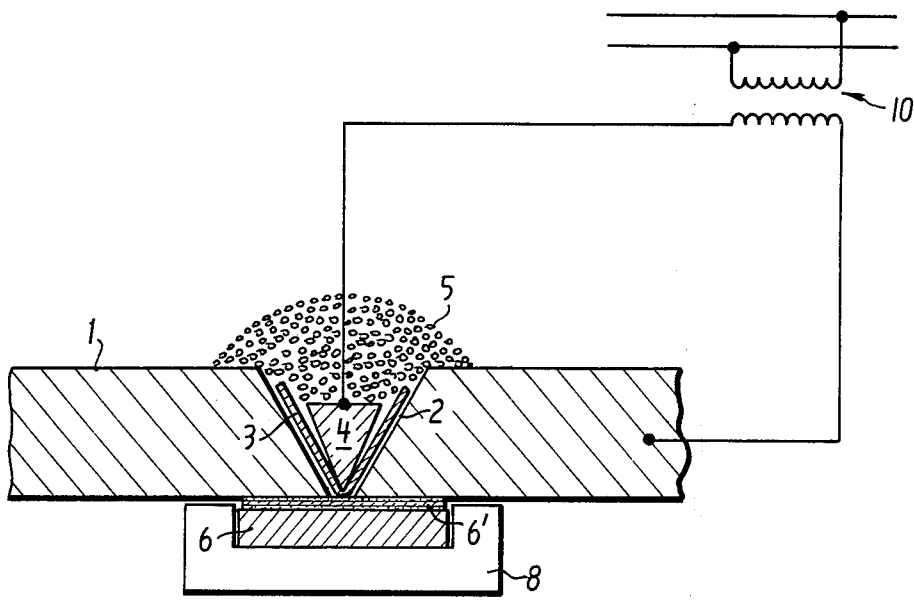
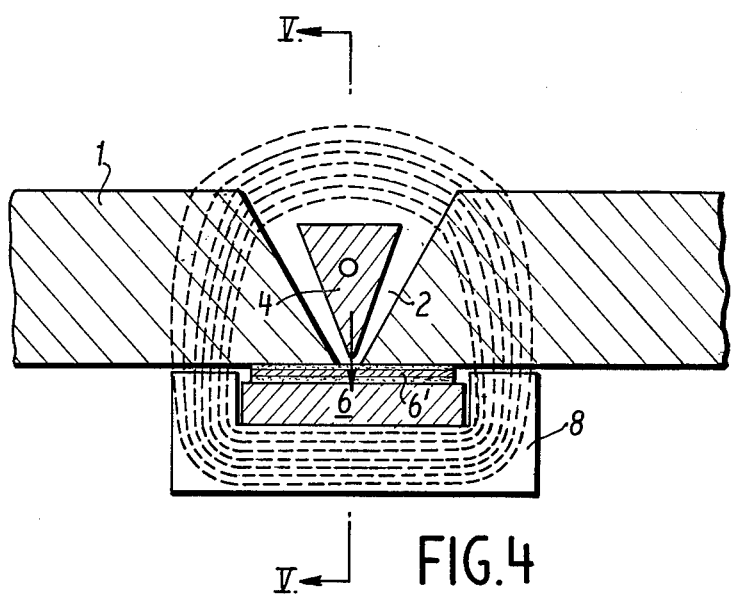

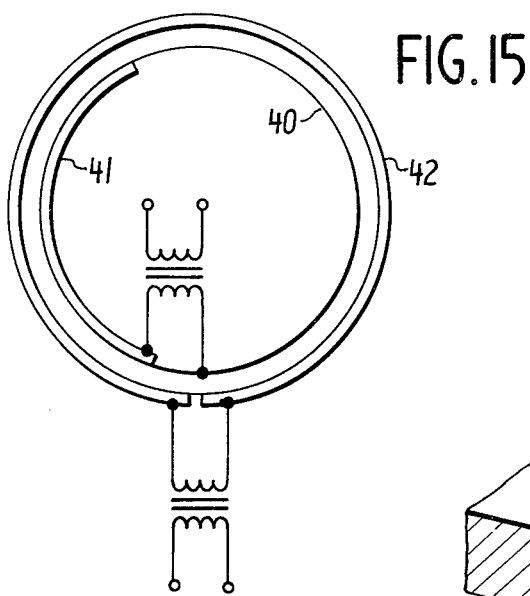
FIG.15
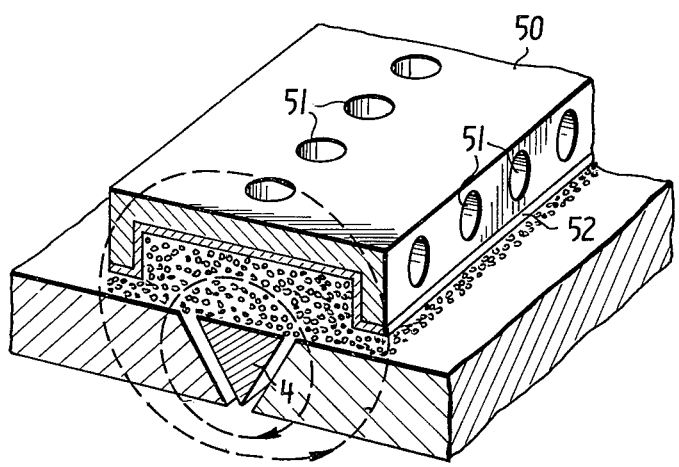
FIG.16
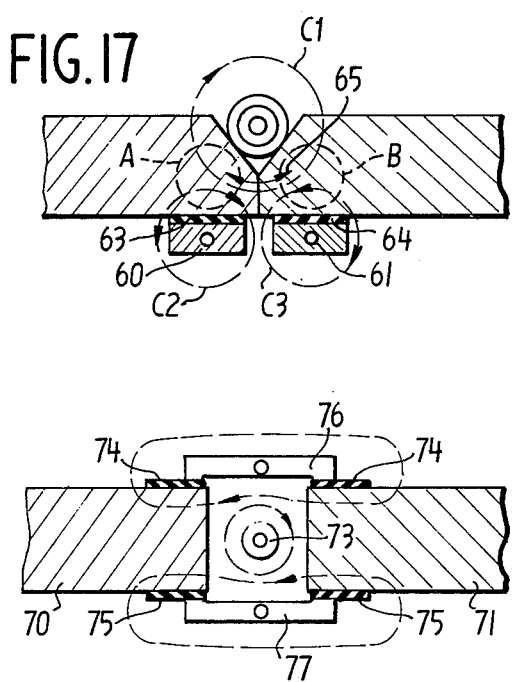
FIG.17
FIG.18
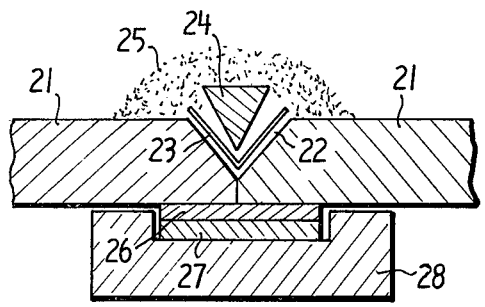
FIG.26
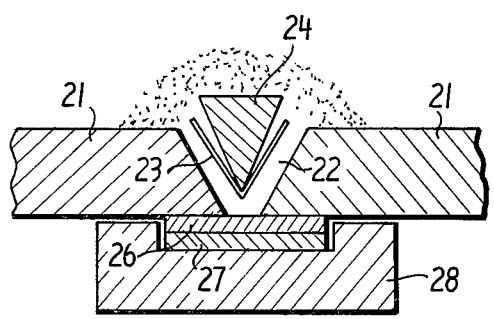
FIG.27

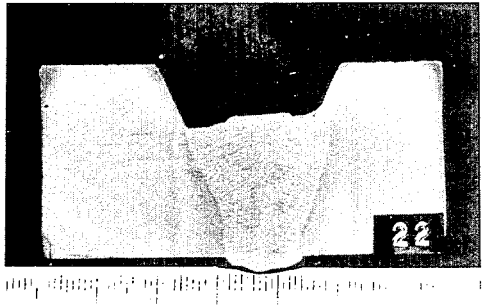
FIG.19
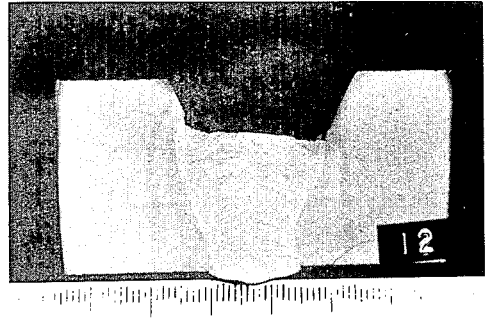
FIG.20
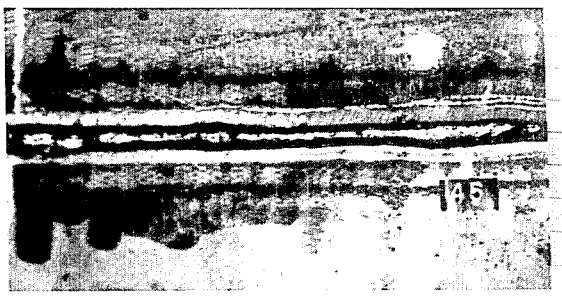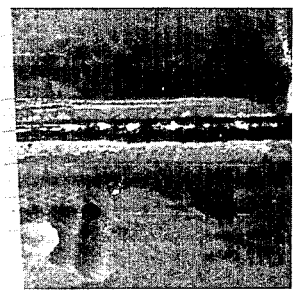
FIG.23
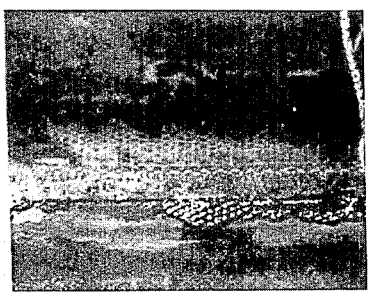
FIG.24

| ROOT GAP | | AMOUNT OF FILLER | SUBSIDIARY CURRENT |
|---|---|---|---|
| 0 | | 0 | 400 A |
| 2mm | | 0 | 200 A |
| 4mm | | 0 | " |
| 6mm | | 6mm | " |
| 8mm | | 8mm | " |
| 10mm | | 10mm | " |

ARC WELDING PROCESS

BACKGROUND OF THE INVENTION

1. Field of the Invention

This invention relates to an arc welding process of the type in which an electrode is placed in a space defined by the inner surfaces of a weld groove in a lengthwise direction thereof, with insulating material interposed between the electrode and the inner surfaces of said groove. More particularly, this invention is associated with a submerged arc welding of the type described.

2. Description of the Prior Art

In the past, in various industries, such as the shipbuilding industry, the development of production-size welding of relatively shorter members of a hull, for example, such as the web of a sidelongeron or the face plate of a cross-tie, has created a fresh approach to arc welding of the type in which an electrode is laid in a weld groove in a lengthwise direction thereof, because of its simplicity and high efficiency. It appears that this conventional process meets the demand of modern manufacturers or ship builders. However, attempts of such natures suffered from many shortcomings. Particularly, the former case involved problems which arise from the balance of an electric power load and the treatment of a cabtyre cable, because it requires the use of a large electric power source. Particularly, in the case of multi-layer welding of a plate over 30 mm in thickness, difficulties arise due to the instability of the back bead, poor peelability of the slag, and poor notch toughness of the deposited metal, which are all attributable to the poor penetration of the weld due to an improper direction of the welding arc produced. Due to the nature of arc welding, there is no way to approach the welding of a weld groove having a small groove angle. Furthermore, even in the case of a weld groove having a wider root gap, if an electrode is placed somewhat off-set to either side of the weld groove, there results poor penetration on the side of the groove from which the electrode is further spaced. The improper direction of the welding arc such as has been experienced in the past will be explained in more detail hereinbelow under the "Detailed Description of The Invention."

Accordingly, a need exists for an arc welding process whereby a welding arc can be directed to the desired portion within the weld groove, with resultant deep penetration, such that the electric power required for the welding can be reduced by a considerable degree, and wherein the weld is free from deficiencies such as unstable back bead formation, poor peelability of slag and poor notch toughness of the deposited metal.

SUMMARY OF THE INVENTION

It is accordingly an object of the invention to provide an arc welding process wherein the arc produced can be directed to a desired portion within a welding groove to thereby achieve improved appearance of the back bead of the weld and accompanying deep penetration at the first or base layer of the weld.

It is a further object of the invention to provide an arc welding process wherein an arc can be alternately directed to either of the inner surfaces of the weld groove to thereby obtain uniform but deep penetration of the weld.

It is a still further object of the invention to provide an arc welding process which permits an adjustment of the penetration of the weld depending on the condition or the configuration of the weld groove.

The foregoing and other objects are attained in accordance with one aspect of the present invention through the provision of an electrode placed in the space defined by the inner surfaces of a weld groove in a lengthwise direction thereof, with an insulating material interposed between the electrode and said inner surfaces, and electromagnetic means such as a subsidiary backing member placed above or beneath the weld groove, said backing member being of a ferromagnetic substance, to thereby provide a region having the least or thinnest density of magnetic flux which can direct the arc produced to a desired portion within the weld groove.

According to a further aspect of the invention, an electrode is placed in the same manner as described above, a subsidiary backing member is placed in the vicinity of a weld groove along the weld line thereof, with said subsidiary backing member being insulated from said weld groove, and an electric current is caused to flow through said subsidiary backing member independently of the welding current.

According to a further aspect of the invention, an electrode is placed in the same manner as described above, a subsidiary backing member is placed above or beneath the weld groove, said backing member being of substance having a lesser magnetic permeability to thereby provide a region having a concentrated or high density of magnetic flux therein by enclosing said region therewith to thereby direct the arc produced to a direction opposite to that of said backing member.

According to a still further aspect of the invention, an electrode is placed in the same manner as described above, a pair of subsidiary backing members are placed above or beneath but in the vicinity of a weld groove along the weld line with said backing members being insulated from said weld groove. A combination of direct current and alternating current is used, as required, as a welding current and as the currents flowing through the subsidiary backing members, respectively, to alternately direct the arc produced between the inner surfaces of the weld groove.

According to a yet further aspect of the invention, there is provided an arc welding process which permits the adjustment of penetration depending on the condition or configuration of a weld groove by placing a subsidiary backing member in the same manner as described above and by adjusting the flow of electric current such that said electric current is caused to flow through said subsidiary backing member independently of the welding current.

BRIEF DESCRIPTION OF THE DRAWINGS

Various objects, features and attendant advantages of the present invention will be more fully appreciated as the same becomes better understood from the following detailed description of the present invention where considered in connection with the accompanying drawings, in which:

FIG. 1 is a side elevation showing a conventional arc welding process in which an electrode is placed in a weld groove in a lengthwise direction thereof;

FIG. 3 is a side elevation showing an arc welding process according to the present invention of the type in which an electrode is placed in a weld groove in a lengthwise direction thereof as in FIG. 1;

FIG. 4 is an explanatory view illustrative of the principles used in the arc welding process of the present invention;

FIG. 15 is a side elevation showing another example of build-up welding;

FIG. 16 is a perspective view showing another embodiment illustrative of the arc welding process of the present invention;

FIG. 17 is a side elevation showing an example of a preferred embodiment in which a pair of subsidiary backing members are used;

FIG. 18 is a plan view showing one example of the arc welding process of the invention which is applied to an electrogas arc welding process;

FIGS. 19, 22 and 23 are photographs which show the weld zones prepared according to the arc welding process of the present invention;

FIGS. 20, 21 and 24 are photographs which show the weld zones prepared according to the conventional arc welding process;

FIGS. 26 and 27 are cross-sectional views taken along the lines VI—VI and VII—VII of FIG. 25, respectively;

DETAILED DESCRIPTION OF THE INVENTION

For a better understanding of the features of the novel arc welding process of the present invention, a conventional arc welding process of the prior art will now be described in detail.

Figure 2:
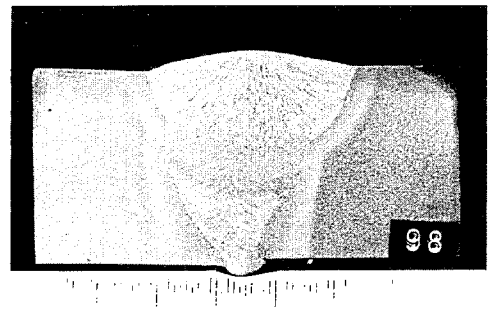
FIG. 2 is a photograph of one example illustrating the penetration of a weld obtained according to the conventional arc welding process of FIG. 1.

Referring now to the drawings, wherein like reference numerals designate indentical or corresponding parts through out the several views, and more particularly to FIG. 1 thereof, there is shown an electrode 4 placed in a weld groove 2 in a lengthwise direction thereof with an insulating material 3 interposed between the electrode and the inner surfaces of the groove. A backing tape 6' and a copper plate 6 positioned thereunder are placed in an abutting relation to the undersurface of the groove 2. Although the welding arc produced thereby is directed forwardly and downwardly, due to the gravity of the molten metal, along the length of the electrode 4, the angle of the arc being directed downwardly is relatively small, such that the arc produced is directed in a substantially horizontal direction. This results in a shallow penetration and a narrow width penetration at the root portion, as shown in FIG. 2. Because of such poor penetration, such a conventional arc welding process is grossly deficient when applied to the welding of a plate of a thicker gage or to a work piece having a high cooling rate or having a narrow root gap. Furthermore, even in the case of a wider root gap, when an electrode is placed in a weld groove in a somewhat off-set relation thereto, poor penetration will occur in one of the inner surfaces of the groove from which said electrode is farther spaced.

We have discovered that such shortcomings arise from an improper direction of the arc being produced. To overcome such shortcomings, the arc should be directed toward the root of the weld groove if a deeper penetration is required. Also, if necessary, the arc should alternately be directed to and between the two inner surfaces of the weld groove to give a uniform penetration in either surface of the weld groove.

THE FIRST EMBODIMENT OF THE INVENTION

Referring now to FIG. 3, in which the novel submerged arc welding process of the present invention is shown, an electrode 4 is placed in a space defined by the inner surfaces of a weld groove 2 in a lengthwise direction thereof, with an insulating material 3 interposed between said electrode and the inner surfaces of the weld groove 2, while flux 5 of a power form covers the welding zone. One of the secondary sides of a welding transformer 10 is connected to the base metal 1 to be welded and the other is connected to the electrode 4. Furthermore, there is placed electromagnetic means such as a subsidiary backing member 8 in an abutting relation to the underside of the weld groove, said backing member being of a ferromagnetic substance and having a channel shape. A backing tape 6' and a copper plate 6 placed thereunder are contained in the channel of backing member 8 in such a manner that said backing tape abuts the undersurface of the weld groove.

It should be noted that the principles of the submerged arc welding process of the present invention can be equally applied to visible arc welding processes other than submerged arc welding.

The subsidiary backing member 8 is made of a ferromagnetic substance such as iron, carbon steel, low alloy steel, or the like. The shape of the backing member 8 may be of a 'U' channel as shown in FIG. 3, but may be of any suitable shape such as circular arc. However, a type having a concaved or recessed portion extending lengthwise therein is preferred for reasons that will become clear from the ensuing description.

Figure 6:
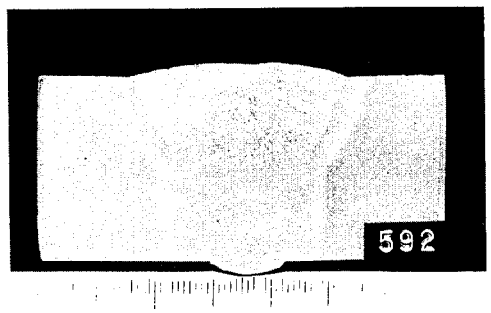
FIG. 6 is a photograph illustrative of an example showing the penetrating condition according to the arc welding process of the present invention.
Figure 5:
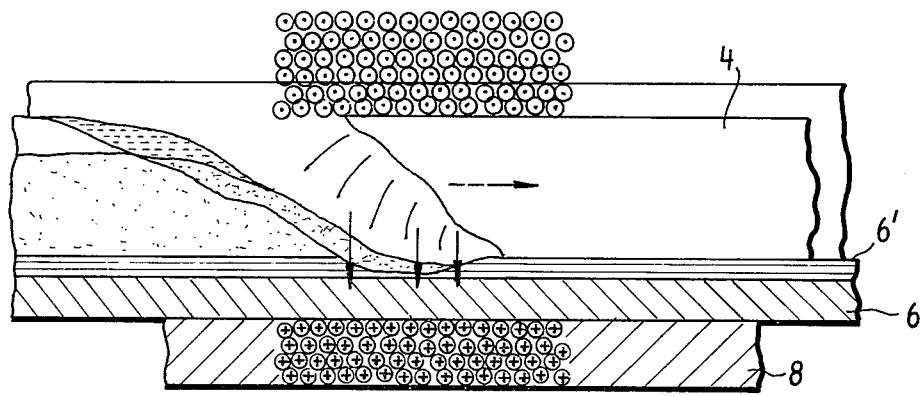
FIG. 5 is a cross-sectional view taken along the line V-V of FIG. 4.

The operational effects of the submerged arc welding process of the present invention will be described with reference to FIGS. 4 and 5. In general, when an electric current flows through an electrical conductor, a magnetic field will be created around said substance. In the case of arc welding wherein an electrode is placed in a weld groove as described earlier, when a welding current flows through an electrode 4 in a direction perpendicular to the plane of the drawing, i.e., from the front to the rear thereof as viewed in FIG. 4, then there will be created magnetic flux in a clockwise direction, as shown, due to the welding current. However, due to the presence of electromagnetic means such as subsidiary backing member 8 comprising a ferromagnetic substance, in addition to the conventional backing comprising a copper plate 6, the magnetic flux will pass through the backing member 8 such that there will be created a region of thinnest or lowest density of the magnetic flux at the backing material placed in the channel of the subsidiary backing member 8. On the other hand, since there is provided no such backing member above the weld groove, there will be created a region having a high density of magnetic flux covering the electrode 4 in a circular arc form. The arc produced tends to be directed towards the region having the thinnest or lowest density of magnetic flux, such that the arc will be forceably directed downwardly as shown by the arrows in FIGS. 4 and 5. This enhances the penetration caused by the arc of the deposited metal, thus providing very deep penetration, as shown in FIG. 6, even when the welding is conducted under the same conditions as in FIG. 2. Thus, the arc welding process of the present invention can be applied to the welding of a work piece having a narrow root gap or that of a plate of a thicker gage having a high cooling rate, which could not otherwise have been achieved by the conventional welding process. Subsidiary backing member 8 may be placed over the entire length of the undersurface of the weld groove or may be placed over that part of the weld groove where the root gap is narrow and hence only partial deep penetration is required. Conversely, in the case wherein a wide root gap is provided along the entire length of the weld groove such that the amount of the deposited metal should be increased, it would be better to place the subsidiary backing member above the weld groove to thereby locate above the electrode the region having the thinnest or lowest density of magnetic flux for the purpose of directing the arc upwardly. Furthermore, if the root gap varies in its width throughout the entire length of the weld groove, the subsidiary backing member can be placed both above or beneath the weld groove to thereby direct the arc downwardly for deeper penetration, or to direct it upwardly for lesser penetration to increase the amount of the deposited metal. As has been described, the present invention is directed to adjusting or changing the path of magnetic flux, such that the location of the subsidiary backing member may be placed above or beneath the weld groove as the case dictates. Furthermore, the shape of the backing member may be either of a channel form or of a plate form. However, the channel form is preferred to obtain a region having the thinnest density of magnetic flux above or beneath the weld groove. If the subsidiary backing member assumes a plate form, said backing member may be placed within a range of 15 mm from the weld groove; however, if the above limit is exceeded, the aforesaid effect may not be achieved.

THE SECOND EMBODIMENT

Figure 7:
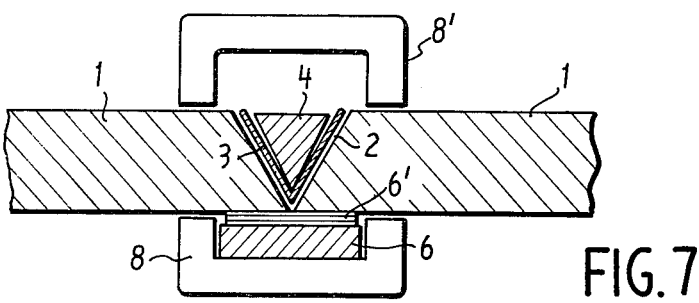
FIG. 7 is a side elevation showing another example of the present invention.

Turning now to FIG. 7, in which another embodiment of the arc welding process of the invention is presented, the subsidiary backing member 8 of a ferromagnetic substance is placed in the same manner as in the first embodiment, while additionally a subsidiary backing member 8' is placed above the weld groove, said backing member 8' having the lesser magnetic permeability. Thus, there will be created a region having a concentrated high density of magnetic flux in the space enclosed with the backing member 8', such that the tendency of the arc to be directed downwardly is enhanced. Conversely, if the subsidiary backing member 8' having the lesser magnetic permeability is placed beneath the weld groove with the subsidiary backing member 8 of a ferromagnetic substance placed above said groove, then the upward directivity of the arc will be further enhanced.

EXAMPLE 1

The work piece to be welded was of a plate form having a groove angle of 50° and a root gap of 3mm. A basic sintered type flux was used, and an electrode was placed in the weld groove of said work piece. The electrode was a low manganese content triangular electrode (an isosceles triangle in cross section, having a base 15 mm long, an isosceles side 20 mm long and a cross sectional area of 150 $mm^2$). As a subsidiary backing member, an iron plate of 6 mm in thickness was bent to form a channel having a circular arc shape in cross section, a maximum depth of 10 mm and a width of 80 mm. The backing member thus formed was placed beneath the weld groove. Then submerged arc welding of the type described above was conducted by causing an electric current of 1,600 A to flow through said triangular electrode. The test results revealed that there was formed a good back bead that was not obtainable when using the conventional process.

EXAMPLE 2

A workpiece to be welded was of a plate form and had a groove angle of 50°and a root gap of 4 mm. A $MnO-SiO_2$ series neutral fusion type flux was used and, as an electrode, a high Mn—Mo content triangular electrode (an isosceles triangle in cross section, having a base 20 mm long, an isosceles side 28 mm long and a cross sectional area of 250 $mm^2$) was utilized. As a subsidiary backing member, an iron plate of 80 mm in width and 15 mm in thickness was bent to form a channel having a rectangular cross section (a width of 80 mm and a depth of 15 mm). The backing member thus formed was placed beneath the weld groove. Then, submerged arc welding of the type specified above was conducted by causing electric current of 2,400 A to flow through the triangular electrode. The test results revealed that a back bead of a width of 12 mm and penetration on either side of the weld having a minimum depth of 4mm was obtained, whereas with the conventional process, a back bead of 6 mm in width and penetration on either side of the weld having a depth of only 1 mm was obtained.

In addition to the above advantages, the present invention provides the following applications and effects:

i. Even in the case of a groove angle of, say, 40°, there can be obtained a back bead.
ii. If the root gap is below 4 mm and inclusive, there can be obtained a back bead.
iii. Even if a 'Y' type weld groove is used, there can be obtained a back bead.
iv. Even with a weld groove having irregular surfaces caused by a manual gas cutting, there can be obtained a back bead.
v. Even if there are tack beads on the surfaces of the weld groove, there can be obtained a back bead.
vi. Even in cases where the conditions such as (i) through (v) above are present partially on the welding line, there can be obtained a uniform back bead.
vii. In the cases of (i) through (vi) above, poor penetration can be minimized.

THE THIRD EMBODIMENT

Figure 8:
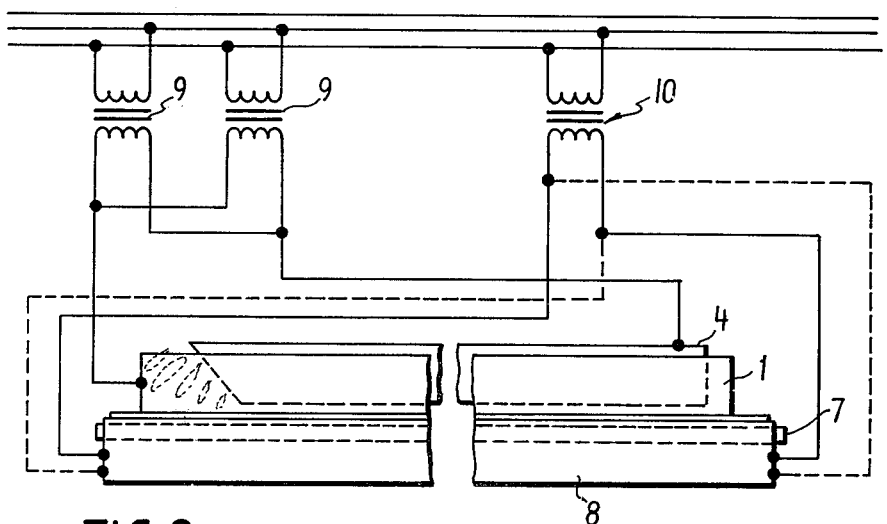
FIG. 8 is a schematic diagram showing one embodiment according to the arc welding process of the present invention.
Figure 9:
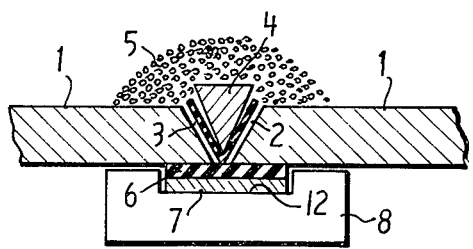
FIG. 9 is a side elevation showing one embodiment according to the arc welding process of the present invention.
Figure 10:
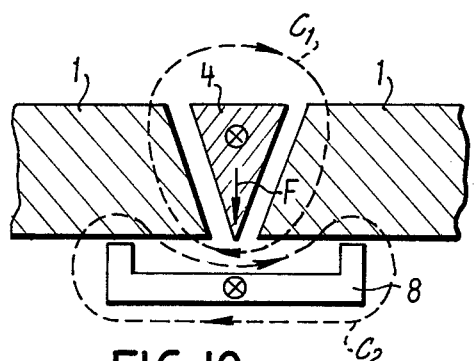
FIG. 10 is a diagram showing the condition of the maagnetic flux of the embodiment of FIG. 8.

Referring now to FIG. 8, in which there is shown another embodiment of the submerged arc welding process according to the present invention, and to FIG. 9, in which there is shown a side elevation thereof, an electrode 4 is placed in a weld groove 2 of the work piece to be welded, with an insulating material of glass tape 3 interposed between the electrode 4 and the inner surfaces of the weld groove, over which there is scattered a flux 5. A flux to provide for the formation of the back bead, a backing material 6 such as a glass tape and a backing member 7 made of a copper plate are placed as shown on the undersurface of the weld groove. One terminal of a welding transformer 9 is connected to the work-piece 1 to be welded, with the other terminal connected by a known method to the electrode 4. Furthermore, a subsidiary backing member 8 is placed under the backing member 7 in such a manner that said subsidiary backing member 8 may be electrically insulated from said workpiece to be welded, said subsidiary backing member being made of a metal such as iron. Both terminals of a subsidiary transformer 10 are connected by using an in-phase connection to the subsidiary backing member 8, said inphase connection feeding an electric current from a single phase power source to flow through the subsidiary backing member, said electric current being approximately 3 to 50% of the welding current flowing in the same direction as that of the welding current during the welding operation. As seen in FIG. 10, an electric current flows through the subsidiary backing member 8 in this manner, the direction of the magnetic flux $C_1$, which is created by the electric current flowing through the welding electrode 4, will be in reverse at the undersurface of the weld groove to that of the magnetic flux $C_2$ which is created by the electric current flowing through the subsidiary backing member 8, thus resulting in a mutual off-setting. Conversely, both magnetic fluxes will be reinforced or strengthened at the position above the weld groove. Since the welding arc tend to be directed toward the region of the thinner or lowest density of magnetic flux, the arc will be directed downwardly, while the electronmagnetic force (F) will likewise be directed downwardly by means of the subsidiary electric current and the welding current, whereby the downward directivity of the arc will be further enhanced. As a result, the penetration of the weld will be extremely deepened, such that good welding can be achieved, even if the workpiece has a thick gage and a narrow weld groove. Furthermore, because of the downward directivity of the arc, the space occupied by the arc will become smaller with a resultant reduced amount of flux used. This further leads to the formation of a lesser amount of slag as well as to a reduced amount of flux to be scattered over the weld groove. Those advantages and features of the welding, with the aid of the downward directivity of the electromagnetic force (F), will result in a uniform and smooth surface of the deposited metal with an advantageous peelability of the slag formed.

On the other hand, although it may be possible to cause an electric current to flow through the copper backing member 7 without using the subsidiary backing member 8, it should be noted that the subsidiary electric current is relatively small in quantity as compared with the welding current. Accordingly, in order to concentrate the magnetic flux caused by the subsidiary electric current at the undersurface of the weld groove, it is advantageous to use a subsidiary backing member 8 having a channel 12 which extends lengthwise thereof.

Alternatively, when the connection of both terminals of the subsidiary transformer 10 to the subsidiary backing member 8 is reversed as shown by the dotted lines in FIG. 8 to thereby reverse the direction of flow of the welding current and the subsidiary electric current, then the arc will be directed upwardly by means of the subsidiary electric current, while a region of thinnest or lowest density of magnetic flux will be created above the weld groove. Thus, the arc will be directed upwardly, thereby accomodating welding processes in which a shallow penetration into the base metal is required.

The relationship between the welding transformer 9 and the subsidiary transformer 10, i.e., the welding current and the subsidiary electric current, may comprise an in-phase or reversed phase electric current obtained by a single phase electric power source, or an electric current to which has been imparted a phase and which is fed through a 'V' connection or a Scott connection from a three-phase power source, or otherwise may be a combination of alternating and direct currents. Particularly, in the case of the combination of alternating and direct currents, the arc can be directed alternately upwardly and downwardly per half cycle of the A.C. power source such that there will result a deep penetration. no undercut portion, a reduced amount of slag and an improved peelability of slag. The additional advantages which accrue are the non-metallic inclusions and gas contained in the molten metal may float up to the molten metal surface to thereby prevent internal defects in the deposited metal, thereby providing improved mechanical properties. Such advantages result from the agitating action of the slag and molten metal in the vicinity of the arc produced, which agitation is due to the upward and downward movements of the arc.

Figure 11:
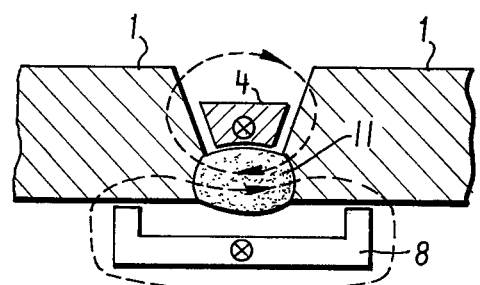
FIG. 11 is a diagram showing the condition of the magnetic flux in the case of multi-layer arc welding.

On the other hand, in the case of a multi-layer welding, as depicted on FIG. 11, there can be obtained good welding for the first layer of the deposited metal for the same reasons which were described with respect to FIGS. 8 to 10. In the case of the second layer welding, as shown in FIG. 11, since the bottom portion of a weld groove of a work piece 1 is welded together to form the first layer weld zone 11, the magnetic flux created by the welding current flowing through the welding electrode 4 and by the subsidiary electric current flowing through the subsidiary backing member 8 will pass through the first layer of weld zone 11 such that both magnetic forces will be offset or reduced in density to direct the arc downwardly.

With the reversed phase electric current, as shown by the dotted lines in FIG. 8, the arc will be directed upwardly for the same reasons as described above.

THE FOURTH EMBODIMENT

Figure 12:
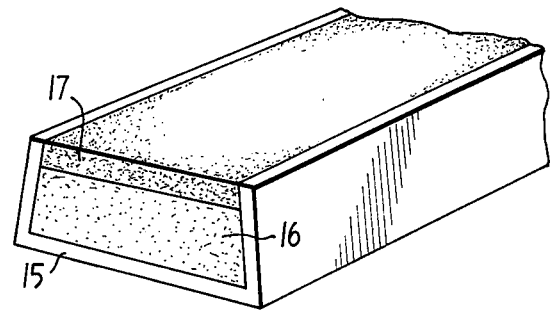
FIG. 12 is a perspective view showing one example of a solid flux used in the arc welding process of the present invention.

Alternatively, there is depicted in FIG. 12 the case wherein there is used a subsidiary backing member in which a solid flux 16 is placed in a metallic casing 15 having a lengthwise channel therein. The subsidiary electric current may be directed through the metallic casing 15, avoiding the use of the subsidiary backing member 8 as shown in FIG. 8.

THE FIFTH EMBODIMENT

Figure 13:
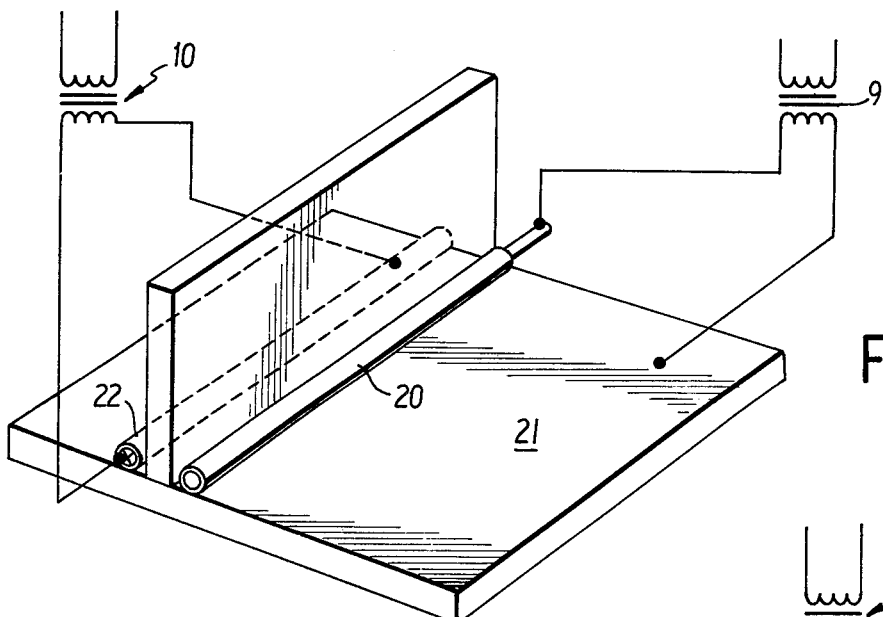
FIG. 13 is a diagram of an embodiment of the arc welding process of the present invention applied to a horizontal fillet welding.

FIG. 13 shows the arc welding process of the present invention being applied to a horizontal fillet welding. In this example, a coated welding rod 20 is placed in a side-by-side relation along the weld line, and both terminals of a welding transformer 9 are connected in a known manner to welding rod 20 and to a work piece 21 to be welded. Furthermore, a subsidiary backing member 22 in a rod form having insulating material coated therearound is placed on the opposite side of the welding rod 20 with respect to the vertical plate. The subsidiary electric current is caused to flow through said subsidiary backing member 22 from the subsidiary transformer 10.

Advantages similar to those obtained in the case shown in FIG. 8 can be expected, i.e., the arc may be directed toward the subsidiary backing member and the electromagnetic force created by the subsidiary electric current may also be directed upwardly. This aids in preventing the formation of a bead of excessive width caused by the downward flow of the molten metal, which has long been a problem in the art of fillet welding.

As is clear from this example, the shape of the subsidiary backing member of the present invention may be of the type having a lengthwise channel as shown in FIG. 8, or may be of a rod form, as necessary, although it should be made of an electrically conductive material.

Alternatively, the subsidiary backing member 22 may be tackwelded to the work piece to be welded so as to prevent the movement or misalignment of the subsidiary backing member 22 during the welding operation. In this case, however, the subsidiary electric current flows through the work piece to be welded, since the subsidiary electric current tends to flow through the portion having the lesser electric resistance, such as a majority of the electric current will flow through the subsidiary backing member 22. Accordingly, a small quantity of electric current will flow through the work piece 21, thus exerting no appreciable effect on the welding effect of the arc welding process according to the present invention. Thus, the arrangement of the subsidiary backing member being insulated from the work piece to be welded may include tack-welding as described above, as well as that of the subsidiary backing member with an insulating coating, or the case where the work piece has rust on its surface on which the subsidiary backing member is placed in an abutting relation thereto. In other words, the term 'insulation' as used herein may include such a condition where most of the subsidiary electric current is flowing through the subsidiary backing member.

On the other hand, even when a gravity type welder or a low angle type welder is used for fillet-welding, the greater bead width due to the downward flowing of the deposited metal may be prevented, because there arises a region of thinnest or lowest density of magnetic flux at a position where the two planes of the magnetic flux intersect with each other, although the plane of magnetic flux created by the welding current is somewhat out of coincidence with that created by the subsidiary electric current.

THE SIXTH EMBODIMENT

Figure 14:
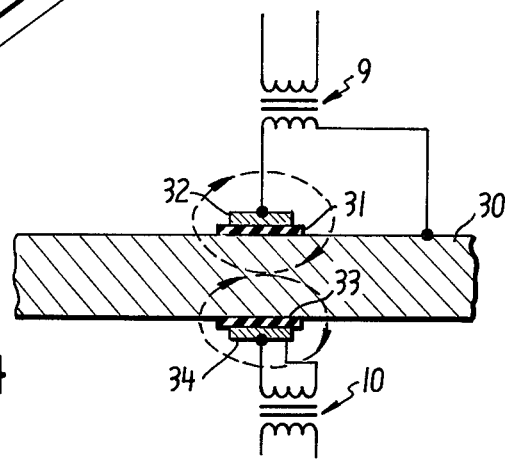
FIG. 14 is a side elevation showing an embodiment of the arc welding process of the present invention, wherein the process is applied to build-up welding.

FIG. 14 shows the arc welding process of the present invention applied to build-up welding. A build-up electrode 32 is placed via insulating material 31 such as a glass tape on the upper surface of a base metal 30. The terminals of a welding transformer 9 are connected by a known manner to the welding electrode 32 and the base metal 30. A subsidiary backing member 34 is placed via insulating material 33 such as glass tape in contact with the undersurface of the weld groove, while both terminals of a subsidiary transformer 10 are connected to the subsidiary backing member 34. When the wiring arrangement as shown by the solid lines of FIG. 8 is used and the base metal 30 is of a ferromagnetic substance, then the magnetic flux created by the subsidiary electric current and welding current will pass through the base metal as shown in FIG. 14, such that there will be created a region of least density of the magnetic flux within the base metal beneath the weld zone, and thereby the arc produced will be directed downwardly, while the downward directivity of the arc will further be enhanced by an electromagnetic force, whereby the penetration will be deepened further. On the other hand, in the case where the base metal has been subjected to a heat-treatment or in the case where steel having a greater carbon content (such as high manganese steel) is used as a base metal and thus the adverse effect by the welding heat on the base metal should be avoided, then the phases of the welding current and subsidiary electric current should be opposite to each other as shown by the dotted lines of FIG. 8, so that the arc may be directed upwardly, thereby providing the desired lesser penetration.

The build-up welding can be applied to the lining of chemical equipment. For instance, as shown in FIG. 15, the lining is applied to the inner surface of a reactor 40 by using stainless steel build-up welding. In this case, however, a stainless steel electrode 41 is placed via insulating material on the inner surface of the reactor, while a subsidiary backing member 42 of a strip form is positioned via insulating material around the outer periphery of said reactor 40. The subsidiary electric current is caused to flow through the subsidiary backing member 42 to thereby effect the lining with the required depth of penetration.

FIG. 16 shows an arc welding process in which an electrode is placed in the weld groove as has been described earlier. In this figure, a subsidiary backing member 50 is placed above the weld groove or weld zone and has a plurality of holes 51 therein which permit the egress of the gas which develops during the welding. The inner surface of the subsidiary backing member 50 is coated with an insulating material such as a glass tape 52. In this respect, to direct the arc downwardly, the direction of the subsidiary electric current flowing through the subsidiary backing member should be opposite to that of the current flowing through the welding electrode 4. With this arrangement, there will be created a region of thinnest or lowest density of magnetic flux on the undersurface of the weld groove, thus resulting in a downwardly directed arc.

THE SEVENTH EMBODIMENT

FIG. 17 shows the seventh embodiment of the arc welding process of the present invention, in which there are placed two subsidiary backing members 60 and 61 via insulating materials 63 and 64 on the undersurface of the weld groove but on the opposite sides thereof, respectively. The subsidiary alternating currents each having a phase difference of 180° are caused to flow through said subsidiary backing members 60 and 61, while alternating current is also used as the welding current. With this arrangement, the line of magnetic force $C_1$ can be maintained constant, whereas the directions of the subsidiary electric currents vary at all times, thereby changing the lines of magnetic force $C_2$ and $C_3$, such that there will be created thin and thick portions of the magnetic flux by means of the magnetic force $C_1$, $C_2$ and $C_3$ on both sides A and B of the weld groove, alternately. Accordingly, the arc will be switched over as shown by an arrow 65 from one side to another. This aids in deepening the penetration with a resultant uniform surface of the deposited metal, while the peelability of the slag may be improved and the removal of gas and non-metallic inclusions contained in the molten metal may be effected due to the agitating action of the molten metal and slag, such that a good deposited metal can be obtained.

Alternatively, a pair of subsidiary backing members may be placed above the weld groove or above and underneath the groove, respectively, as desired.

THE EIGHTH EMBODIMENT

Still with reference to FIG. 17, direct currents having opposite directions may be used as the subsidiary electric currents flowing through subsidiary backing members 60 and 61, respectively, while an alternating current is used as the welding current. Furthermore, electric currents having a phase difference may be used as the subsidiary electric currents. In the latter case, there will be created thin and thick regions of magnetic flux density at the regions A and B, alternately, such that the arc produced will be periodically switched over from one side to another as shown by arrow 65. Such effect may be further enhanced by using subsidiary electric currents having a phase difference of 180° and by using as a welding current an alternating current having a phase difference of 90°.

THE NINTH EMBODIMENT

FIG. 18 shows the arc welding process of the present invention applied to an electrogas welding. In this figure, a welding wire 73 is fed into a weld groove of the work pieces 70 and 71 to be welded together, and subsidiary backing members 76 and 77 (in most cases comprising copper backing members) are placed on the opposite upper and lower sides of work pieces 70 and 71, respectively, with the insulating materials 74 and 75 interposed between said subsidiary backing members 76 and 77 and the work pieces 70 and 71, respectively. Alternating currents having a phase difference of 180° are caused to flow through the subsidiary backing members 76 and 77, while a direct current flows through the welding wire 73, such that, for the same reasons as in the case depicted in FIG. 17, the arc produced will be switched over from one side to another to and between the subsidiary backing members 76 and 77, providing a rocking motion of the arc. It follows that a uniform surface of the deposited metal can be achieved due to the weaving action, as well as bringing about easy removal of the gas contained in the molten metal due to the agitating action of the molten metal and slag.

As is apparent from the foregoing description, according to the arc welding process of the present invention, at least one subsidiary backing member is placed in close vicinity to the work piece to be welded, in such a manner so as to be insulated therefrom and extend along the weld line, and electric current is caused to flow through said subsidiary backing member, whereby the arc produced will be directed to the required portion in the weld groove to thereby adjust the depth of penetration of the deposited metal. Furthermore, this type of arrangement of the welding process finds various applications as has been described thus far, with the resultant attractive advantages.

It should be recognized, however, that there have been proposed various processes wherein electric current is caused to flow through the molten metal to prevent the undercut of the bead. However, that type of process has been proven to fail when applied to the welding of a work piece having a narrow root gap and a small groove angle. In addition, that type of process suffers from disadvantages in that, as compared with the conventional processes, a great amount of electric current is required to weld the same work piece, thus being inapplicable to a steel having a greater carbon content and causing a shortage in the capacity of the power source, if the welding requires a great amount of electric current. The present invention has succeeded in avoiding such drawbacks with the aforedescribed attractive results.

EXAMPLE 3

Each welding equipment was arranged as shown in FIGS. 8 and 9, and an in-phase alternating current was used as the welding current and subsidiary electric currents. A photograph of the cross section of the weld zone thus obtained is shown in FIG. 19. A complete insulation was maintained between the subsidiary backing member and the work piece to be welded.

Welding specifications:
Work piece to be welded — thickness, 32 mm; Type of Steel, SM-50 (Japanese Industrial Standard)
Weld groove — Groove angle, 50°; 'V' type; Root gap, 4 mm
Welding electrode — Isosceles triangular, high Mn-Mo base electrode having a base of 20 mm and height of 28 mm.
Flux — Fusion type basic flux
Welding current — 2400 A (AC)
Subsidiary electric current — 200A (AC)
Insulating material — Glass fiber tape
The rate of the amount of slag produced — 2300 g/m

EXAMPLE 4

The same specifications as in Example 3 were utilized except that the subsidiary electric current was 800 A (AC) and the subsidiary backing member was placed in a manner so as to contact the work piece to be welded to thereby cause the subsidiary electric current to flow through the subsidiary backing member as well as the work piece to be welded. FIG. 20 shows a photograph of the cross section of the weld zone thus obtained. The rate of the amount of slag produced was 1,840 g/m.

As is clear from FIGS. 19 and 20, the arc welding process of the invention, in which the subsidiary backing member is insulated from the work piece to be welded, provides a deeper penetration, despite the subsidiary electric current being one fourth the welding current, as compared with the case where the subsidiary backing member is not insulated from the work piece to be welded. This means that if the subsidiary electric current is allowed to flow through the work piece, then the objects of the present invention will not be attained in that a much greater amount of electric current would be required to attain a penetration of the same depth.

EXAMPLE 5

Figures 21, 22:
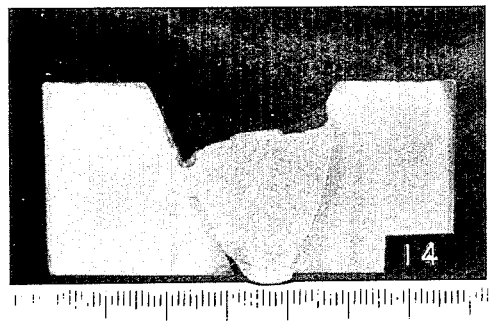

The same welding specifications were followed except for the omission of the use of the subsidiary electric current. FIG. 21 shows a photograph of the cross section of the weld zone thus obtained. The rate of the amount of slag produced was found to be 5,750 g/m.

As can be seen from FIG. 21, the omission of the subsidiary electric current leads to incomplete fusion at the bottom of the weld groove. When the subsidiary electric current is not used, there results incomplete penetration or failure to produce the back bead. The rate of the amount of slag produced when the subsidiary electric current was used was found to be 2,300 g/m, being over half the rate of that of the present example which was 5750 g/m. This proves that arc welding that utilizes the subsidiary electric current according to the present invention saves on the amount of flux to be used as compared with the case in which the subsidiary electric current is not used, as in this Example.

EXAMPLE 6

Welding equipments were arranged as shown in FIGS. 8 and 9, and a filling material containing iron powder was filled between the insulating tape 3 and the work piece to be welded. The welding was conducted with in-phase alternating currents being used as the welding current as well as the subsidiary electric current, according to the following specifications. Photographs of the cross sections of the weld zones thus obtained are shown in FIG. 22. The insulation between the subsidiary backing member and the work piece to be welded was maintained satisfactorily.

Welding specifications:
Work piece to be welded — thickness, 12 mm; Type of steel, SS-41 (Japanese Industrial Standard)
Groove angle — 50°, 'V' type
Root gap — 0, 2, 4, 6, 8, 10 mm
Welding electrode — Isosceles triangular, low carbon steel base electrode having a base of 14 mm and height of 18 mm.
Flux — Sintered type flux containing iron powder
Welding current — 1250 A (AC)
Subsidiary electric current — 400 A, 200 A (AC)
Insulating tape — Glass fiber tape As is clear from FIG. 22, according to the present example, there was obtained a deep penetration, or rather too deep a penetration in the case wherein a subsidiary electric current of 400 A (root gap of zero mm) was utilized. With the combined use of metal powder such as iron powder, there was achieved a good bead. Table 1 shows the amount of the slag produced and mechanical properties of the deposited metal of steel.

Table 1

| Root gap (mm) | Rate of the amount of slag produced (g/m) | Yield strength (kg/mm$^2$) | Tensile Strength (kg/mm$^2$) |
|---|---|---|---|
| 0 | 545 | 31.7 | 45.5 |
| 2 | 379 | 31.1 | 44.6 |
| 4 | 410 | 31.6 | 44.9 |
| 6 | 406 | 31.4 | 44.1 |
| 8 | 500 | 32.3 | 44.3 |
| 10 | 503 | 31.8 | 43.5 |

Table 1 reveals that the welding process of the present invention provides a minimized rate of the amount of slag produced along with satisfactory mechanical properties.

EXAMPLE 7

The same specifications were utilized as in Example 6, except that the subsidiary electric current was omitted and the welding current was increased to 1,600 A (AC). The lengthwise welding strain of the welded work piece was measured and compared with that of the work piece obtained in Example 6. Table 2 represents the results thereof.

Table 2

| Root gap | Example 6 | Example 7 |
|---|---|---|
| 0 (mm) | 0/1000 (mm) | +10.0/1000 (mm) |
| 2 | +1.5/1000 | + 6.9/1000 |
| 4 | −1.5/1000 | + 1.5/1000 |
| 6 | 0/1000 | + 0.3/1000 |
| 8 | 0/1000 | − 4.9/1000 |
| 10 | +1.2/1000 | − 8.9/1000 |
| Total strain | 4.2 | 32.5 |
| Average strain | 0.7/1000 | 5.4/1000 |

As can be seen from the above table, the welding strain in the case where the subsidiary electric current was utilized proved to be much less than in the case without the use of the subsidiary electric current, the values being reduced about one-eighth.

EXAMPLE 8

Welding equipments were arranged as shown in FIGS. 8 and 9, and the welding was conducted with in-phase alternating currents used as the welding current as well as the subsidiary electric current. A photograph of the cross section of the weld zone thus obtained is shown in FIG. 23. A good insulating relation was maintained between the work piece welded and the subsidiary backing member.

Welding specifications:
Work piece to be welded — thickness, 12 mm; type of steel, SS-41 (Japanese Industrial Standard)
Weld groove — groove angle 50°; 'V' type; root gap, 0 mm
Welding electrode — A low Mn content steel base electrode having an isosceles triangular cross section having a base of 14 mm and a height of 18 mm.
Flux — Sintered type flux containing iron powder
Welding current — 1,200 A (AC)
Subsidiary electric current — 400 A (AC)
Rate of the amount of slag produced — 550 g/m

EXAMPLE 9

The following welding specifications were followed. FIG. 24 shows a photograph of the undersurface of the weld zone thus obtained.

Welding specifications:
Welding electrode — A low Mn steel base electrode having an isosceles triangular cross section with a base of 15 mm and a height of 20 mm.
Welding current — 1600 A (AC)
Subsidiary electric current — 0

The other particulars were the same as in Example 7. The rate of the amount of slag produced was 1,200 g/m. A comparison of the photograph of the back bead (FIG. 23) in the case wherein the subsidiary electric current was used, with that (FIG. 24) in the case where the subsidiary electric current was not used, reveals that even if the total electric current remains the same, a good back bead was obtained in the case of the use of the subsidiary electric current, whereas no back bead resulted in the absence of the subsidiary electric current. This proves that the arc welding process of the present invention can achieve good welding results with less welding current as compared with conventional processes. Accordingly, even if the work piece is susceptible to adverse effects due to welding heat, the present invention can be successfully applied in such a case because there is required only a small amount of welding current, i.e., heat input, thereby exerting no adverse effect on the work piece welded.

It should be appreciated that the desired value of the subsidiary electric current is a function of various conditions, such as the thickness of the work piece to be welded, the groove angle, the root gap, the welding current, and the required penetration depth. However, the subsidiary electric current is preferably 3 to 50% of the welding current.

The present invention provides numerous advantages over the prior art, and they can be summarized as follows for the second through ninth embodiments:

i. The combination of the use of an alternating current and direct current as the welding current and the subsidiary electric current permits a periodical change in the directivity of the arc, whereby the molten metal and the fused flux can be agitated with a resultant removal of gas and non-metallic inclusions, and achievement of a uniform metal structure and a weld zone having a high mechanical strength.

ii. When the arc welding process of the invention is applied to electrogas welding, the directivity of the arc can be changed periodically, thereby yielding an effect similar to that of weaving, such that the conventional weaving process can be avoided or the width of the weaving can be reduced.

iii. Where the arc welding process of the invention is applied to horizontal fillet welding, the arc produced can be directed in a horizontal or upward direction, such that various problems, such as non-uniform leg length of the deposited metal due to the downward flowing of the molten metal, can be avoided with a resultant good fillet welding.

iv. When the arc welding process of the invention is applied to build-up welding, the arc can be directed toward the work piece being welded, or if necessary, the arc can be controlled so as to lessen the penetration depth of the deposited metal. The welding can also be acomplished even where the base metal has been heat-treated, avoiding the post heat-treatment after the welding.

THE TENTH EMBODIMENT

In this embodiment, the arc being produced can be controlled for depth of penetration by varying the amperage of the subsidiary electric current, the direction of the electric current, and the phase difference between the welding current and the subsidiary electric current. This embodiment can be well adapted to a situation where the root gaps vary throughout the welding line of a work piece to be welded.

Figure 25:
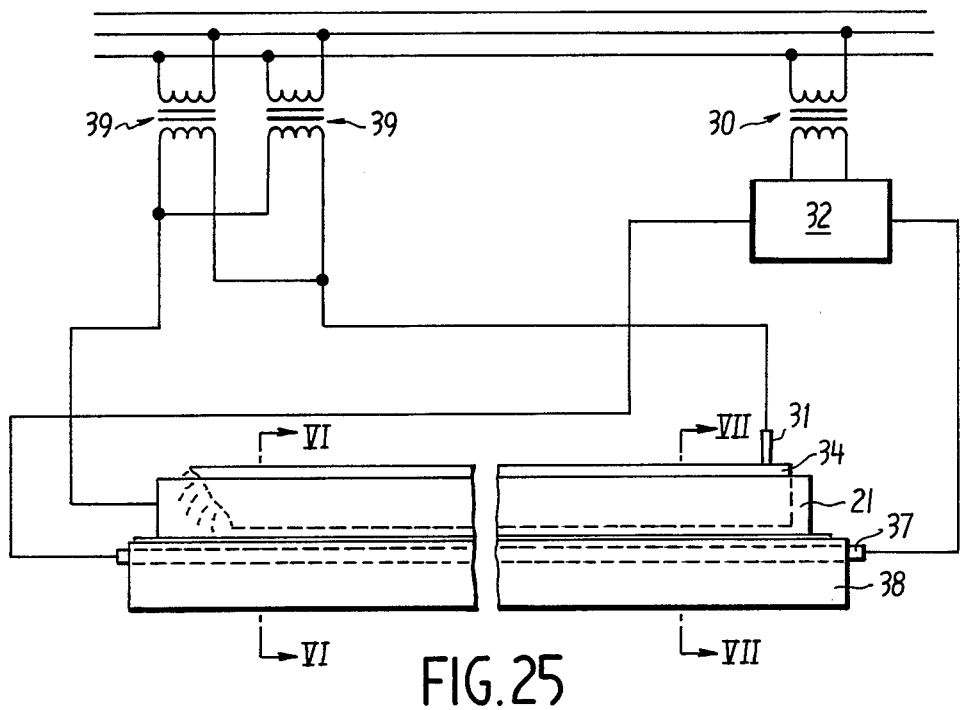
FIG. 25 is a schematic diagram showing another embodiment of the arc welding process of the present invention.

Referring now to FIG. 25, there is shown a schematic of a submerged arc welding apparatus in which an electrode is placed in the weld groove along the length thereof, as in FIG. 8. A work piece 21 has a 'Y' type weld groove at the cross section VI—VI, shown in FIG. 26, perhaps due to poor workmanship, and has a 'V' type weld groove at the other end at the cross section VII—VII, as shown in FIG. 27. Shown in FIGS. 25, 26 and 27 are an insulating material 23 such as a glass tape, a welding electrode 24, flux 25, backing material 26, a copper backing member 27, a subsidiary backing member 28, a welding transformer 39, a subsidiary transformer 30, a conductor rod 31 and a subsidiary electric current controlling circuit 32. The subsidiary electric current controlling circuit 32 serves to adjust the current flowing through the subsidiary backing member 28 from the subsidiary transformer 30. When the welding proceeds in a direction from the 'Y' type groove to the 'V' type groove as shown in FIG. 5, the subsidiary electric current will be reduced continuously therewith, such that the electromagnetic force, caused by the parallel in-phase currents of the welding current and the subsidiary electric current and adapted to act on the arc so as to direct it downwardly, will be reduced accordingly, to thereby reduce the depth of the penetration therewith. Thus, a greater attracting force is created for the arc at the 'Y' type groove and then a gradually less or reversed attracting force may be provided for the 'V' type groove, whereby a constant welding condition may be obtained despite the differing groove conditions.

Figure 28:
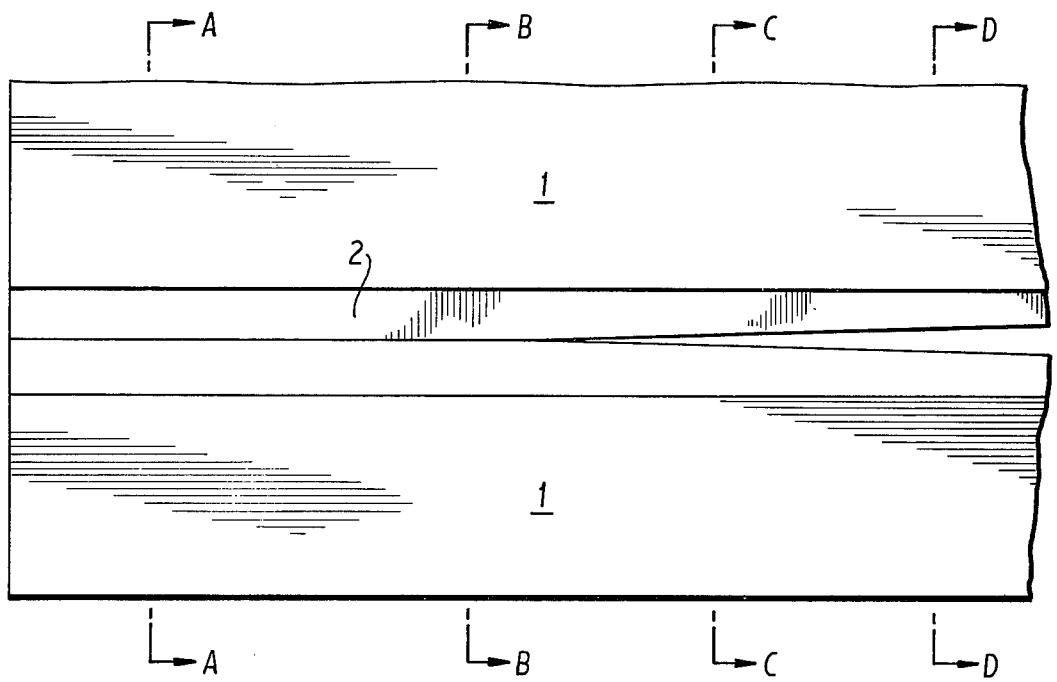
FIG. 28 is a front view showing the conditions of a weld groove.

The relationship between the groove condition and the phase difference of the electric current will now be described. FIG. 28 shows a work piece 1 having various weld grooves 2. FIGS. 29a, 29b, 29c and 29d are the cross sections taken along lines A—A, B—B, C—C and D—D, respectively of FIG. 28. FIGS. 30a, 30b, 30c and 30d are explanatory views showing the phase conditions of the welding current $I_1$ and a subsidiary electric current $I_2$ at the respective cross sections taken as above, the phase differences being represented by $\theta a$, $\theta b$, $\theta c$ and $\theta d$, respectively. Shown shaded in FIGS. 30a–30d are the portions where the phases of the currents coincide with each other to thereby direct the arc downwardly.

Figure 29A:
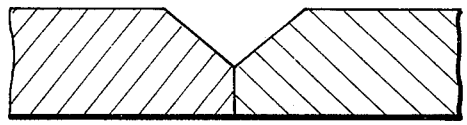
FIGS. 29a, 29b, 29c and 29d are cross-sectional views taken along the lines A—A, B—B, C—C and D—D of FIG. 28 respectively.

The 'Y' type groove at the cross section A—A as shown in FIG. 29a comprises a shallow groove, such that deeper penetration is required. For this purpose, the in-phase subsidiary electric currents having a phase difference $\theta d$ of almost zero are caused to flow through the subsidiary backing member placed beneath the wild groove, with the result that deep penetration and a good back bead are obtained.

Figure 30A:
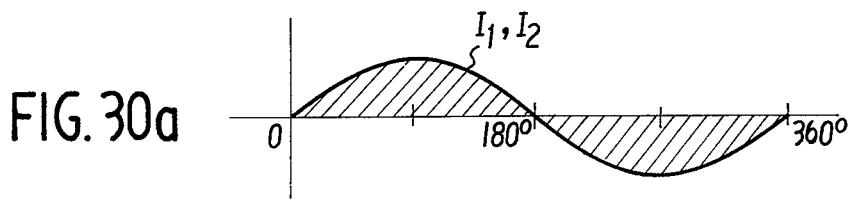
FIGS. 30a, 30b, 30c and 30d are explanatory views showing the phase conditions of electric currents flowing through the subsidiary backing member at the cross sections illustrated in FIG. 28.
Figure 30B:
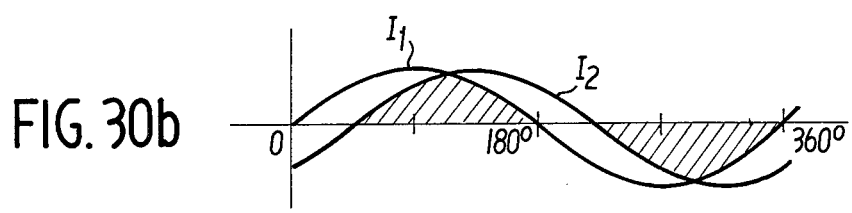
Figure 30C:
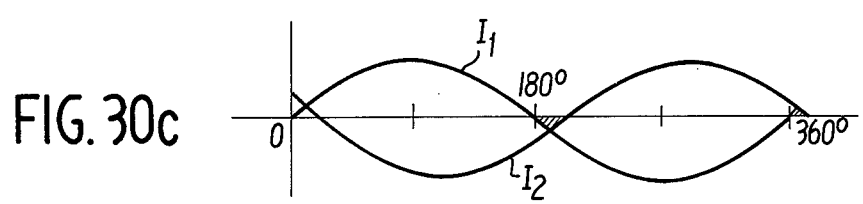
Figure 29B:
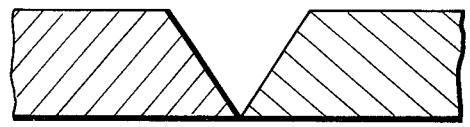
Figure 29C:

The 'V' type groove taken at the cross section B—B as shown in FIG. 29b has a 'V' type groove with zero root gap, such that a relatively smaller penetration will be required. Thus, the welding may be conducted by using a phase difference $\theta c$ of 90°, as shown in FIG. 30b. In this case, deep penetration cannot be obtained, although agitating action of the molten metal in the weld results to thereby provide a good back bead. Alternatively, in the absence of phase control, a small amount of in-phase electric current may be used as the subsidiary electric current. The weld groove at the cross section C—C as shown in FIG. 29c is of a 'V' type groove having a small root gap, such that the welding may be conducted without the use of the subsidiary electric current or by using subsidiary electric current having a phase difference $\theta d$ greater than 180° as shown in FIG. 30c. Thus, the welding arc may be directed in a horizontal or upward direction, resulting in a good back bead. Alternatively, in the absence of phase control, the connection for the subsidiary electric current may be reversed to use the reversed phase current of a small amperage thus obtained.

Figure 30D:
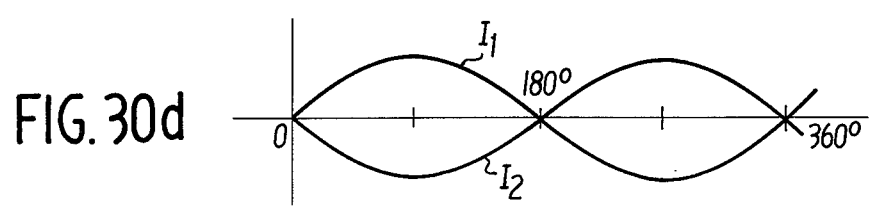
Figure 29D:

The weld groove at the cross section D—D in FIG. 29d is of a 'V' type groove, having a large root gap, such that there may be used a subsidiary electric current of a large amperage having a phase difference of 360° as shown in FIG. 30d. Accordingly, the arc will be directed upwardly to limit the formation of the back bead with the resultant good back bead similar to that obtained in the previous case.

In this manner, according to the present invention, the level and direction of the electric current may be adjusted to accomodate the varying groove shapes to achieve a uniform, good welding. Alternatively, when the subsidiary backing member is placed above the weld groove, the same results may be obtained by reversing the phase of the current.

Referring again to FIG. 25, there tends to be created a crater in the vicinity of or beneath the conductor rod 31. In the past, the adjustment for removing such a crater has a recourse to the timing of the conductor rod 31 to be removed. However, according to the present invention, such a crater may be successfully eliminated by adjusting the subsidiary electric current. More specifically, when the welding arc comes in the vicinity of the conductor rod, the subsidiary electric current may be reduced, or otherwise its phase difference to the welding current may be reversed by 180°, such that the reversed phase parallel currents will produce a repulsive magnetic field which in turn acts on the arc so as to adjust the depth of penetration.

As has been described, the adjustment of the subsidiary electric current allows uniform welding even in the face of undesirable conditions such as varying groove conditions and or the occurrence of a crater. For this purpose, it is necessary that the subsidiary electric current be controlled through the subsidiary electric current controlling circuit 32 so as to meet the varying shapes of the weld groove. Such a controlling method may be effected by means of a timer or by programming when welding speed can be considered to be constant or when the timing of welding at a specific position can be predetermined. This then permits a uniform bead to be obtained.

THE ELEVENTH EMBODIMENT

For automating such a controlling operation, the welding conditions may be detected continuously and then fed back to the subsidiary current controlling circuit. As one example, there has been proposed a method wherein the position of the welding arc is detected by a photocell such as phototransistor, while the temperature at the back bead corresponding to the position of said welding arc is detected by means which is responsive to temperature in a non-contacting manner, i.e., by such as an infrared-ray responsive element, such that the subsidiary current controlling circuit may be operated by means of the output thus obtained.

As is clear from the above, the present invention is directed to controlling the directivity of the arc governed by an electromagnetic force to thereby obtain a good welding condition. The following example embodies the controlled welding process according to the present invention. The materials used in the following example are as follows:

Thickness of the material to be welded — 12 mm
Weld groove — 50°, 'V' type
Length of weld — 560 mm
Condition of root gap — Front half portion: 6 mm; Rear half portion: 0–2 mm.

EXAMPLE 10

The above material was welded according to the submerged welding process of the type described, using basic sintered type flux and a manganese electrode at a welding electric current of 1,600 A. The front half portion having a root gap of 6 mm gave a back bead of about 9 mm in width, whereas the rear half portion could not give any back bead except for the crater portion.

In another test, the material the same as that in the previous case was welded by using a subsidiary transformer and a timerintegrated-type subsidiary electric current controlling device. 49 seconds after the welding had been started, the timer was actuated to cause a subsidiary electric current of 400 A to flow in a direction and at a phase the same as those of the welding current. As a result, both the front and rear halves yielded good weld joints having good back beads of 6 mm in width which required no back chipping welding.

However, even with the foregoing welding process using such a timer, there occured craters of about 600 mm in diameter both at a position spaced 280 mm from the starting position of welding and where a varied root gap existed, and at the terminating position of welding, providing a back bead having a width as great as 20 to 25 mm.

However, since a back bead having such a large width should be prevented, because it leads to lateral cracking, the aforesaid subsidiary electric current controlling circuit was provided with an interruptor. Thus, the subsidiary electric current was interrupted for 40 seconds after the commencement of welding until the subsidiary transformer has been set to give 400 A, for the purpose of preventing the occurrence of a crater, after which the subsidiary electric current was caused to flow for 30 seconds. The subsidiary electric current was cut before cutting the welding current in the vicinity of the terminating portion of the welding so as to prevent the occurrence of the crater.

As a result, there was obtained a uniform back bead throughout the front and rear half portions, free from craters.

It will be understood that the above description is merely illustrative of preferred embodiments of the invention. Additional modifications and improvements utilizing the discoveries of the present invention can be readily anticipated by those skilled in the art from the present disclosure, and such modifications and improvements may fairly be presumed to be within the scope and purview of the invention as defined by the claims that follow.

What is claimed as new and desired to be secured by Letters Patent of the United States is:

1. An arc welding process, comprising the steps of:
    positioning an electrode in a space defined by the inner surfaces of a weld groove in a length wise direction thereof,
    interposing an insulating material between said electrode and said inner surfaces, and
    placing an electromagnetic means in the vicinity of said weld groove,
    applying a subsidiary electric current independent of said welding current to said electromagnetic means,
    wherein said electromagnetic means comprises a first subsidiary backing member placed either above or beneath said weld groove and a second subsidiary backing member placed at a position opposite said first backing member with respect to said weld groove, said subsidiary electric current comprises two currents which flow in said first and second backing member, respectively and wherein a current flow through said first subsidiary backing member is in a direction opposite to a current flowing through said second subsidiary backing member and wherein said welding current comprises an alternating current and said subsidiary currents comprise direct currents,
    for controlling the path of magnetic flux caused by a welding current to be applied to said electrode and members to be welded whereby the welding arc is directed towards a predetermined region in said groove.

2. An arc welding process, comprising the steps of:
    positioning an electrode in a space defined by the inner surfaces of a weld groove in a length wise direction thereof,
    interposing an insulating material between said electrode and said inner surfaces,
    placing an electromagnetic means in the vicinity of said weld groove,
    applying a subsidiary electric current independent of said welding current to said electromagnetic means,
    wherein said electromagnetic means comprises a first subsidiary backing member placed either above or beneath said weld groove and a second subsidiary backing member placed at a position opposite said first backing member with respect to said weld groove, said subsidiary electric current comprises two currents which flow in said first and second backing member, respectively, said first and second subsidiary backing members are substantially insulated from said members to be welded, and said current flowing through said first subsidiary backing member has a phase difference from said current flowing through said second subsidiary backing member, and said welding current comprises an alternating current, for controlling the path of magnetic flux caused by a welding current to be applied to said electrode and members to be welded whereby the welding arc is directed towards a predetermined region in said groove.

* * * * *